UNITED STATES PATENT OFFICE.

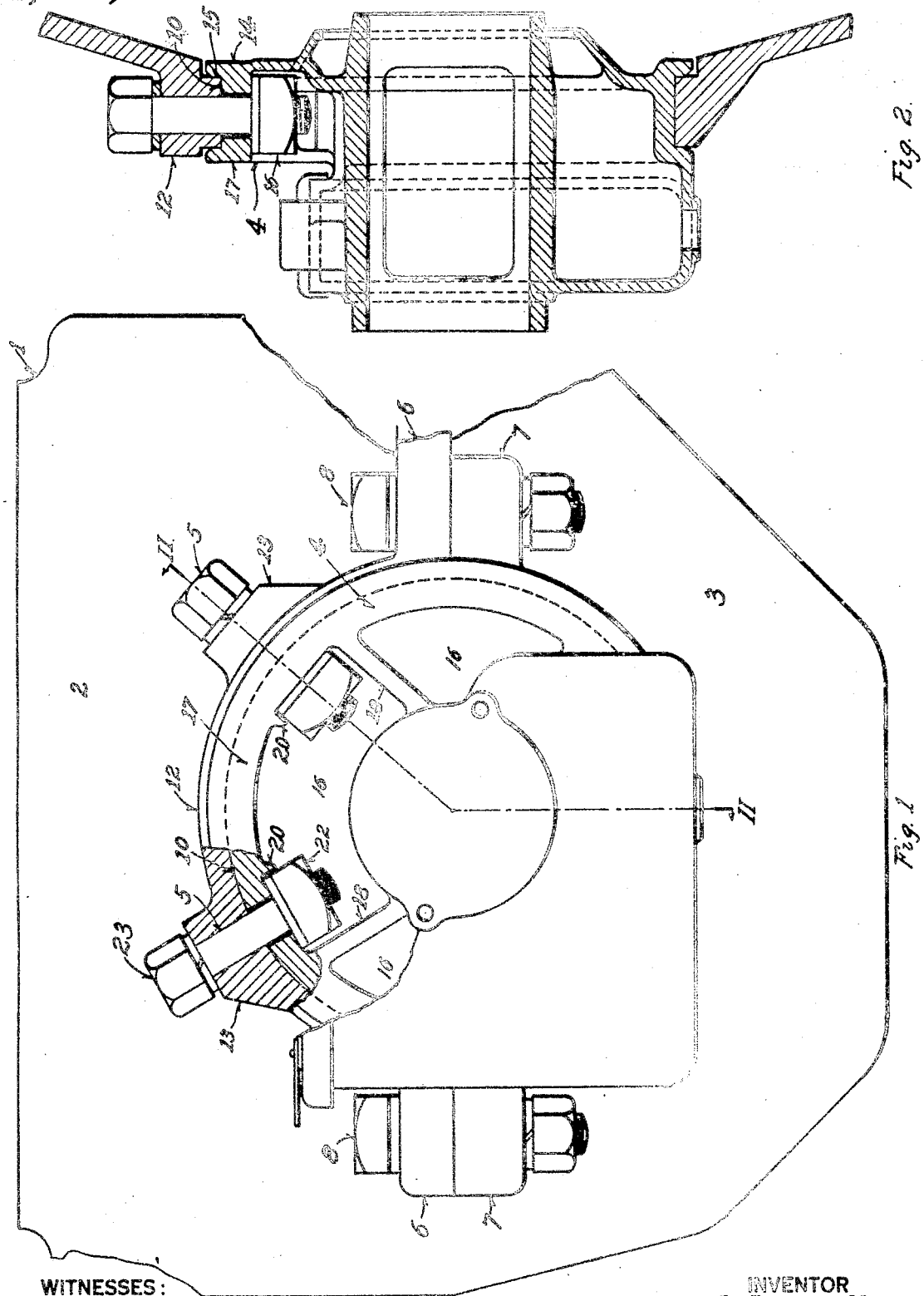

AUBREY L. BROOMALL, OF WILKINSBURG, AND EDWIN G. TIDLUND, OF PITTSBURGH, PENNSYLVANIA, ASSIGNORS TO WESTINGHOUSE ELECTRIC AND MANUFACTURING COMPANY, A CORPORATION OF PENNSYLVANIA.

BEARING.

1,241,493.  Specification of Letters Patent.  Patented Oct. 2, 1917.

Application filed October 9, 1914. Serial No. 865,843.

*To all whom it may concern:*

Be it known that we, AUBREY L. BROOMALL, a citizen of the United States, and a resident of Wilkinsburg, in the county of Allegheny and State of Pennsylvania, and EDWIN G. TIDLUND, a subject of the King of Sweden and a resident of Pittsburgh, in the county of Allegheny and State of Pennsylvania, have invented a new and useful Improvement in Bearings, of which the following is a specification.

Our invention relates to motor structures, and it has special reference to bearing housings for railway motors of the split-frame type, and to means for securing such housings in position.

One of the objects of our invention is to provide a structure of the above-indicated character which shall be simple, light and inexpensive in construction; which may be manufactured with a minimum amount of machine work, and the arrangement and location of parts of which are such that through-bolts may be utilized for securing the housing to the motor frame.

In the prior art, it has been common to provide the upper half of the motor frame with a semi-circular end-projecting flange and to employ tap bolts that project through the flange and are threaded into the housing. With this construction, however, if the frame bolts are allowed to become loose, severe vibration and jars may occur, which result in undue wearing of the threads, not only of the housing bolts, but of the tapped holes in the housings. Looseness in the fit and chattering of the parts therefore take place, which necessitates the replacement of the housing bolts and, moreover, the retapping or threading of the housing holes.

In other forms of construction heretofore employed, the upper half of the motor frame is not only provided with a semi-circular flange, but also with diametrically opposite projecting radial flanges adjacent to the split of the frame, while the housing itself embodies similar oppositely projecting radial arms or flanges which are adapted for engagement with the upper frame radial flanges. Through-bolts are then provided to coöperate with these radial flanges for clamping the housing and upper half of the frame together.

While this type of construction is satisfactory from an operative point of view, it is unnecessarily expensive in that it requires extremely accurate machine work; for instance, the coöperating faces of the radial flanges referred to and the inner cylindrical surface of the frame must be carefully machined, and, in case of slight inaccuracies in the work, a good tight joint may be obtained between the radial arms while the coöperating circular faces of the frame and of the housing may be slightly spaced apart, or vice versa.

According to our present invention, we propose to overcome the difficulties and expense of prior constructions which have been discussed, and to provide a structure in which the housing may be rigidly positioned by through-bolts and with a minimum amount of machine work.

In the accompanying drawing, Figure 1 is a view, partially in section and partially in end elevation, of a portion of a railway motor constructed in accordance with our invention; and Fig. 2 is a sectional view of a portion of the device shown in Fig. 1, the section being taken along the line II—II of Fig. 1.

Referring to the drawing, the apparatus shown comprises a motor 1 having an upper frame member 2 and a lower frame member 3, a housing 4 and a plurality of through-bolts 5.

The motor 1 is of the split-frame type, and the upper and lower halves thereof may be of any well-known construction, each being provided with coöperating lugs 6 and 7 located adjacent to the split of the frame for the purpose of coöperating with suitable clamping bolts 8 employed for securing the two halves together. The ends of the two-part frame are provided with correspondingly located circular openings 10 to receive the housings 4. The upper half of the frame 2 has a circular outwardly projecting flange 12 adjacent to the edge of the opening 10 which is provided with bosses 13.

The housing 4, in general, is of any common type of construction and is circular in form and adapted to be disposed within the circular opening 10 of the end of the motor frame and is clamped in position by means of the frame parts 2 and 3. A circular portion 14 constitutes a part of the housing 4 and is provided with a peripheral annular recess 15 for receiving the inner edge of the flange 12 of the upper frame member 2. Moreover, the portion 14 of the housing is provided with a plurality of pockets 16 which serve to provide a substantially circular outwardly projecting flange 17 for coöperative engagement with the corresponding circular flange 12 of the frame member 2, said flanges being concentrically related and adapted to fit tightly, the one within the other. The adjacent coöperating surfaces of the flanges 12 and 17, just referred to, are the only ones requiring machine work in manufacturing. Intermediate the pockets 16 of the housing 4 are ribs 18, and the inner surface of the flange 17 is provided with inwardly projecting bosses 20.

Assuming the housing 4 to be in position with respect to the motor frame parts 2 and 3, it is rigidly clamped to the upper frame member 2 by means of the through-bolts 5 which project radially through the flange 12 of the frame member 2 and the coöperating flange 17 of the housing 4. The inner threaded ends of the bolts 5 are provided with nuts 22 which are locked against turning by means of the ribs 18 and bosses 20. The other ends of the bolts 5 have heads 23, as usual, by means of which the housing 4 and frame member 2 may be drawn tightly together while the nuts 22 are locked in position.

We desire that only such limitations shall be imposed as are indicated in the appended claims.

We claim as our invention:

1. In a dynamo-electric machine, the combination with a split magnetizable frame having circular end openings therein and circular outer end flanges, of removable bearing housings adapted to be seated in said circular end openings and having corresponding circular outer end flanges, and a plurality of radially-disposed bolts projecting through said corresponding flanges for rigidly securing said housings in position.

2. In a split-frame motor having circular end openings, the combination with bearing housings disposed in said openings and having outwardly projecting circular flanges, of corresponding circular flanges upon the upper half of said motor frame, and a plurality of radially disposed bolts projecting entirely through said corresponding flanges for securing said housings to the upper half of the frame.

3. In a split-frame motor having a circular end opening, the combination with a circular flange around the opening in the upper half of the frame, of a circular bearing housing disposed in said opening and having pockets in the upper part thereof, through-bolts projecting through said circular flange and through the portion of the housing between its outer edge and said pockets, and nuts disposed in said pockets and coöperating with said bolts for clamping said housing rigidly in position, said nuts being held against turning in said pockets.

4. In a split-frame motor having a circular end opening, the combination with a circular housing disposed in said opening, of a plurality of through-bolts projecting radially through portions of said frame and said housings, and nuts coöperating therewith for clamping said housing in position.

5. The combination with a hollow frame having upper and lower halves, and provided with a circular end opening and an integral projecting flange partially surrounding said opening, of a circular member disposed within said opening and having a corresponding projecting flange adapted to fit within said first flange, and through-bolts projecting through said flanges in a radial direction for securing said member to one half of said frame.

6. In a dynamo-electric machine, the combination with a split-frame having a circular end opening, and an integral outwardly projecting member adjacent to the edge of said opening, of a circular bearing housing disposed within said opening, an integral outwardly projecting member adjacent to the periphery of said housing and registering with said first projecting member, and radially disposed through-bolts projecting through said registering members for clamping said housing to said frame.

7. In a dynamo-electric machine, the combination with a frame having an end opening, of a bearing-housing adapted to be received in said opening and a plurality of radially-disposed bolts adapted to secure said housing in place.

8. In a dynamo-electric machine, the combination with a split frame having an end opening and a flange on the upper portion of the frame adjacent to said opening, of a bearing housing adapted to be received in said opening and a plurality of radially-disposed bolts adapted to secure said housing in place.

In testimony whereof, we have hereunto subscribed our names this 7th day of Oct., 1914.

AUBREY L. BROOMALL.
EDWIN G. TIDLUND.

Witnesses:
JOHN S. DEAN,
B. B. HINES.